May 3, 1966 P. M. GILFILLAN 3,249,482
LAMINATED STRUCTURE AND METHOD
Filed June 26, 1963
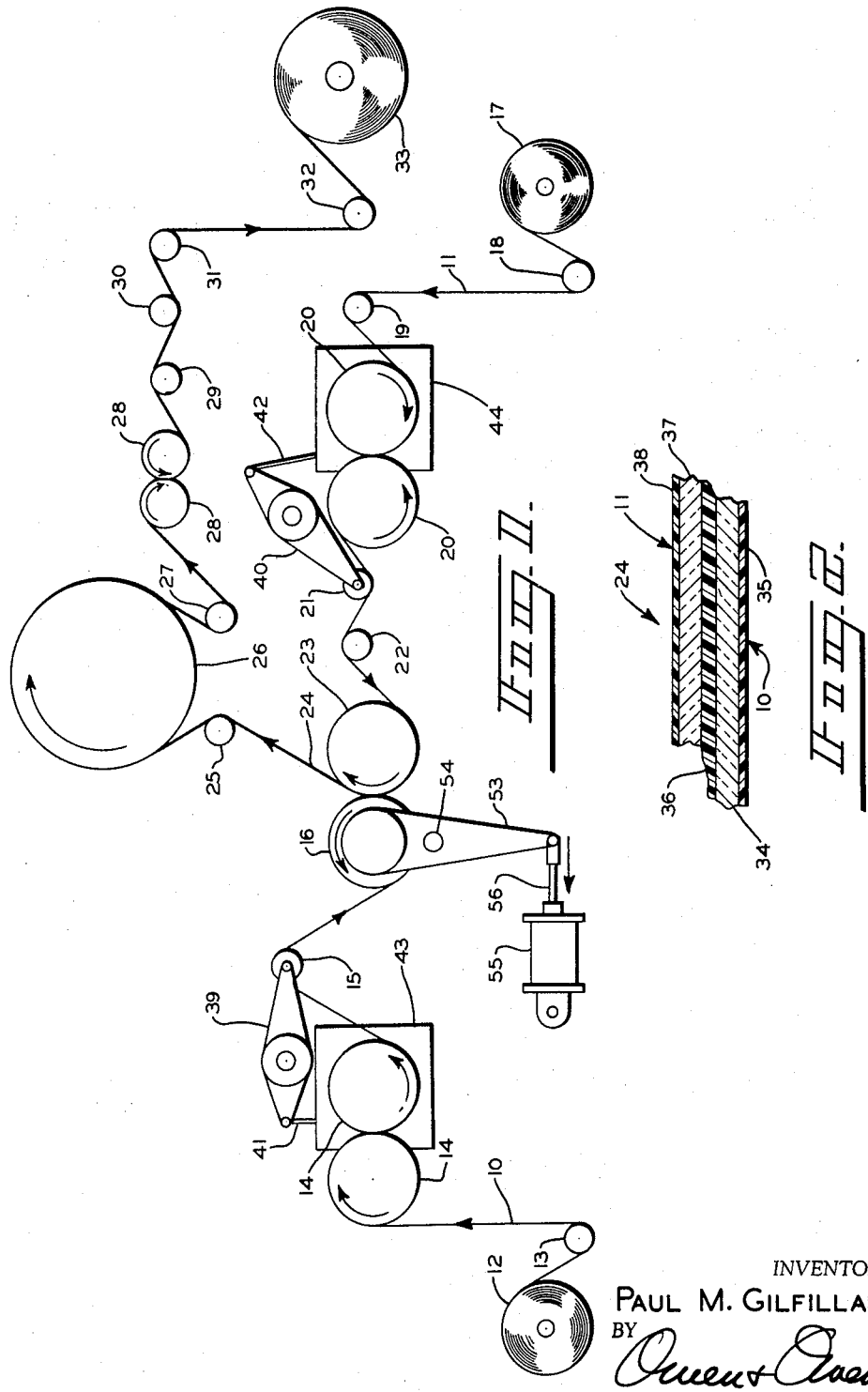
INVENTOR.
PAUL M. GILFILLAN
BY
Owen+Owen
ATTORNEYS

United States Patent Office 3,249,482
Patented May 3, 1966

3,249,482
LAMINATED STRUCTURE AND METHOD
Paul M. Gilfillan, Louisville, Ky., assignor, by mesne assignments, to Bank of Louisville-Royal Bank & Trust Co., Louisville, Ky., a corporation of Kentucky
Filed June 26, 1963, Ser. No. 290,748
6 Claims. (Cl. 156—322)

This application is a continuation-in-part of U.S. application Serial No. 175,185, filed February 23, 1962, entitled Paper Impregnation and Serial No. 188,198, filed April 17, 1962, entitled Laminated Structure and Method, both now abandoned.

This invention relates to improved integrally bonded low cost laminated structures having high strength, grease resistance, and low moisture vapor transmission; and which are also preferably arranged to include outer transparent layers which cover and protect layers of conventionally applied and normally easy damaged printed material.

One structure that can be produced according to the present invention includes two, juxtaposed, regenerated cellulose films thermally laminated together by an intermediate layer of saran [1], and each of which carries an exterior coating of saran.

Cellophane, or regenerated cellulose film material, has found widespread use in the packaging industry because of many outstanding properties. For example, the material is completely transparent to visible light so that it can be incorporated in packages through which the contents are visible. High-speed printing techniques for use with the material have been developed, as well as heat sealable coatings therefor, so that packages which are attractively decorated and which carry a desired message can be produced economically. Coated cellophane films have good moisture vapor transmission properties and grease resistance, and are completely safe and suitable for the packaging of many types of foodstuffs, having F.D.A. approval.

For some packaging applications it has been found that saran-coated cellophane films lack the strength properties that are required. In such instances what have been denominated "duplex" packages have been used. A duplex package is one made from two completely separate sheets of coated cellophane film, with an air space therebetween. For example, two juxtaposed sheets may be formed into a tube with a slight overlap of the edges of the sheets, and then the overlapped edges heat sealed together; bags may then be formed from the tube by providing lateral heat seals at regularly spaced intervals and cutting the tube laterally just above or just below each of the lateral heat sealed regions. Each tube segment thus cut constitutes a bag, which can be closed by heat sealing after filling with suitable content material. Although duplex packages have strength, moisture vapor transmission and grease resistance properties which are satisfactory for many applications, there are numerous difficulties inherent therein which have caused the general recognition in the packaging industry of the need for an improved packaging material which would combine or improve upon the strength and other properties of duplex packages, but which would avoid certain difficulties that have been encountered with duplex packages. For example, during aging of a duplex package, moisture sometimes condenses between the two cellophane films. Such condensation, when it occurs, sharply reduces transparency. In addition, there is a long felt need for a way to eliminate the manipulative problems that are involved in producing duplex packages.

One structure of the present invention is based upon the discovery that two thin films of cellophane, each of which has been provided with a saran coating, can be heat sealed together to provide a laminated sheet which is a packaging material having substantially improved properties by comparison with previously known materials. For example, bags made therefrom have been found to have more than three times the durability, as measured by a conventional tumbling test, of duplex bags made from the same, unlaminated, coated cellophane films. In addition, the bags made from the laminated material according to the invention are not subject to moisture condensation under any conditions of storage; as a consequence, they retain their initial clarity throughout their entire lives. Further, it has been found that the clarity of a laminated sheet according to the invention is remarkably high by comparison with that of previously known packaging materials of comparable weight, and that printing incorporated within the laminated sheet by conventional techniques is clearly visible from the outside of the packaging material. The printing may be applied to one of the cellophane films or may be applied to one of the saran surfaces which are bonded together. Inasmuch as the laminated material of the present invention has saran on its outer and inner surfaces, its edges can be lapped and sealed without the use of a separate sealing agent by the mere application of heat in the same manner as is in common practice with the prior art single film of saran coated cellophane.

Another structure not produced heretofore but which has the improved properties to which the present invention is directed comprises paper coated or impregnated with polyethylene, and either used as such or bonded to other layers or laminates.

It is, therefore, an object of the invention to provide an improved packaging material which is of a laminated type.

It is a further object of the invention to provide a method for producing a laminated packaging material.

Other objects and advantages will be apparent from the description which follows, reference being made to the accompanying drawings, in which:

FIG. 1 is a schematic line diagram showing the method according to the invention for producing a laminated packaging material; and, FIG. 2 is a sectional view of laminated packaging material according to the invention.

Referring now in more detail to the drawings, and, specifically, to FIG. 1, laminated packaging material according to the invention can be produced from a first film 10 of cellophane coated on both sides with saran, and a second, similar film 11. The first film 10 is fed from a supply roll 12, under a guide roll 13, into driven relationship with a pair of cooperating variable speed, driven feed

---

[1] Saran is now the generic name for a family of commercially available vinylidene chloride copolymers containing a major proportion of vinylidene chloride, i.e., a vinylidene chloride content from 50% to 95%.

rolls 14, then upwardly over and about halfway around a tension control roll 15, and finally downwardly and about half-way around a heated steel roll 16. The second film 11 is fed from a supply roll 17, under an idler guide roll 18, over an idler guide roll 19, into driven relationship with a pair of variable speed, driven feed rolls 20, under a tension control roll 21, upwardly over and around an idler guide roll 22, and finally downwardly and about half-way around a rubber roll 23. The roll 23 is urged against the heated roll 16 to press the films 10 and 11 together in the nip between the two rolls.

The roll 16 is heated to soften the saran coatings on the films 10 and 11, but is more effective to supply heat to the coatings on the film 10 because such film is in direct contact with the heated roll 16 for approximately one-half revolution thereof, while the film 11 is separated from the heated roll 16 by the film 10, and is subjected to the heating action of the roll for only a fraction of the time that the film 10 is subjected to such action. However, the rubber roll 23 is a secondary source of heat for the film 11, which it heats to a temperature somewhat lower than that of the film 10.

Laminated film material according to the invention, designated by the reference numeral 24, is delivered from the nip between the rolls 16 and 23, and travels upwardly around a guide roll 25, most of the way around a chill roll 26, around a guide roll 27, and into driven relationship with a pair of variable speed pull rolls 28. After leaving the pull rolls 28, the laminated material 24 travels over an idler guide roll 29 generally horizontally under a guide roll 30 and over a guide roll 31, downwardly under an idler guide roll 32, and onto a rewind, take-up roll 33.

The laminated film material 24 is shown in cross section in FIG. 2. The material 24 comprises the lower film 10 and the upper film 11. It will be noted that the material 24 is made up of a lower cellophane or regenerated cellulose sheet 34, saran coatings 35 and 36 on the lower and upper surfaces of the sheet 34, respectively, and a cellophane or regenerated cellulose sheet 37 with an upper saran coating 38. The saran coating layer 36 is also a coating on the cellophane sheet 37, and is approximately twice as thick as the coatings 35 and 38. The layer 36 was formed by the uniform fusion together, without the formation of air pockets, of adjacent, thinner coatings on the films 10 and 11, so that there is, in fact, an intermediate region in which the saran coatings of the films 10 and 11 are actually mixed with one another. This region, however, cannot be illustrated because, in fact, the saran film 36 is essentially homogeneous, or, at least, does not vary in any visible manner.

It has been found that the films 10 and 11 must be delivered to the heated roll 16 and the rubber roll 23 under substantially identical, and rather carefully controlled tensions. The speeds of the pairs of driven rolls 14, 19 and 22 are controlled to provide the required conditions relative to tension. Specifically, the driven pull rolls 28 are operated at a substantially constant speed and the driven feed rolls 14 and 20 are operated at substantially identical speeds, and provide a tension on the film 10, on the film 11, and on the laminate 21 within certain relatively narrow limits. To this end, the tension control rolls 15 and 21 are journalled in pivoted members 39 and 40, respectively. An increase or a decrease in the tension of the film 10 or 11 causes swinging movement of the member 39 or 40, to raise or lower an actuator 41 or 42, as the case may be, for a speed controller 43 or 44 that is operatively associated with the drive means (not shown) for the rolls 14 and 20. It should be noted that both the heated roll 16 and the rubber roll 23 are merely idlers, insofar as feeding of the films 10 and 11 and of the laminate 24 is concerned. The temperature of the heated rolls 16 and the time of contact of the film 10 therewith are also critical in producing a laminate according to the invention, as is the pressure of the rubber roll 23 against the heated roll 16. Operable, preferred and optimum limits on these several variables are set forth in Table I, below:

*Table I*

|  | Operable | Preferred | Optimum |
| --- | --- | --- | --- |
| Tension in pounds per foot of width on films 10 and 11. | 20–50 | 30–40 | About 35. |
| Temperature in ° F. of the heated roll 16. | 195–215 | 200–210 | About 205. |
| Temperature in ° F. of the rubber roll 23. | 175–195 | 180–190 | About 185. |
| Time of contact in seconds between the film 10 and the heated roll 16. | ½–¾ | ---------- | About 0.6. |
| Time of contact in seconds between the film 11 and film 10 which is in contact with the heated roll 16. | 1/60–1/120 | ---------- | 1/50–1/40 |
| Time of contact in seconds between the film 10 and the rubber roll 23. | ½–¾ | ---------- | About 0.6. |
| Pressure in pounds per square inch exerted upon the films 10 and 11 by the roll 23 acting against the heated roll 16. | 600–1,200 | 650–1,000 | 650–850. |
| Thickness in mils of each of cellophane layers 34 and 37. | ½–3 | ½–1½ | About 4/5. |
| Linear speed in feet per minute of the films 10 and 11. | 100–200 | 125–175 | About 150. |

As is indicated in the foregoing table, although the rubber roll 23 is not directly heated, it actually operates, in service, at a temperature only a relatively few degrees below that of the heated roll 16. The heat of the rubber roll 23 is important, as it partially softens the saran coating of the film 11 which is ultimately fused to an adjacent saran coating of the film 10. Such heating of the saran coatings can be considered as a surface activation of the films 10 and 11 to enable lamination.

As has been indicated above, the pressure between the heated roll 16 and the rubber roll 23 is a critical variable in producing the laminate according to the invention. The pressure can be as high as about 1200 pounds per square inch, and could be even higher insofar as the production of a satisfactory laminate is concerned, but higher pressures are not necessary, and undesirably affect the cost of apparatus for accomplishing the lamination. These exceptionally high laminating pressures are achieved with the apparatus shown in FIG. 1, by journalling both ends of the heated roll 16 in arms 53 which are suitably supported for pivotal movement about pins 54, and using air pressure in a cylinder 55 to urge an interior piston and a rod 56 in the direction indicated by the arrows. The rods 56 are pinned to the lower extremities of the arms 53, so that the force on the rods 56 urges the heated roll 16 against the rubber roll 23. Excellent results have been achieved, for example, when the force with which the heated roll was urged against the rubber roll 23 caused the latter to deform sufficiently to provide an area of contact between the two rolls which was approximately ⅜" wide, and when the force was sufficient that the laminating pressure, throughout this area of contact, was within the ranges previously set forth, with and without solvent activation. Printing on saran has long been known, but has suffered from the deficiency that it does not adhere well to the saran and is easily damaged. By placing a printed surface of one of the saran coated cellophane sheets against the surface of another one of the saran coated cellophane sheets and bonding the two together according to any of the processes previously described, a laminate is provided wherein the printed material is completely protected and readily visible from the outside of the laminant.

It will be apparent that various changes and modifications can be made from the specific details set forth herein and shown in the attached drawings without departing from the spirit and scope of the invention as defined in the appended claims.

What I claim is:

1. A method for producing a laminated packaging material comprising continuously advancing a first film of regenerated cellulose having a; vinylidene chloride interpolymer having a vinylidene chloride content from 50 percent to 95 percent and a fusion point of at least 270° F.; coatings on both of its major surfaces into a compression zone, continuously advancing a second film of regenerated cellulose having said above mentioned coatings on both of its major surfaces into the compression zone and into juxtaposition relative to the first film, causing the coating on the first film to become adhered to a coating of the second film without the aid of a solvent by heating the films to a temperature between approximately 190° F. and approximately 200° F., compressing the juxtaposed sheets in the compression zone under a pressure above approximately 600 p.s.i. and less than approximately 1000 p.s.i. to force the adjacent coatings of the sheets into intimate bonding contact to cause adhesion therebetween and to form the first and second films into a continuous laminate, and cooling the resulting laminate.

2. A method for producing a laminated packaging material comprising continuously advancing a first film of regenerated cellulose having a vinylidene chloride interpolymer having a vinylidene chloride content from 50 percent to 95 percent and a fusion point of at least 270° F.; coatings on both of its major surfaces into a compression zone, continuously advancing a second film of regenerated cellulose having said above mentioned coatings on both of its major surfaces into the compression zone and into juxtaposition relative to the first film, causing the coating on the first film to become adhered to a coating of the second film without the aid of a solvent by heating the films to a temperature between approximately 190° F. and 200° F., compressing the juxtaposed sheets in the compression zone under a pressure between approximately 600 to 1200 pounds per square inch to force the adjacent coatings of the sheets into intimate bonding contact to cause adhesion therebetween and to form the first and second films into a continuous laminate, and cooling the resulting laminate.

3. A method for producing a laminated packaging material comprising continuously advancing a first film of regenerated cellulose having a vinylidene chloride interpolymer having a vinylidene chloride content from 50 percent to 95 percent and a fusion point above approximately 270° F.; coatings on both of its major surfaces into a compression zone, continuously advancing a second film of regenerated cellulose having said above mentioned coatings on both of its major surfaces into the compression zone and into juxtaposition relative to the first film, causing the coating on the first film to become adhered to a coating of the second film without the aid of a solvent by heating the first film to a temperature between approximately 190° F. and approximately 200° F., compressing the juxtaposed sheets in the compression zone while at a temperature between approximately 190° F. and approximately 200° F.; under a pressure between approximately 600 to 1200 pounds per square inch to force the adjacent coatings of the sheets into intimate bonding contact to cause adhesion therebetween and to form the first and second films into a continuous laminate, and cooling the resulting laminate.

4. A packaging material produced by the method of claim 1, comprising: first and second layers of regenerated cellulose uniformly and tightly bonded together by an intermediate layer of a vinylidene chloride interpolymers having a vinylidene chloride content from 50 percent to 95 percent and a fusion point above approximately 270° F.; said first and second layers also having a pair of similar outer coatings of said interpolymers and individual ones of which are uniformly and tightly bonded to respective ones of the outer surfaces of said first and second layers of regenerated cellulose to completely protect said layers of regenerated cellulose, and said layer of interpolymer; between said first and second layer of regenerated cellulose being approximately twice as thick as said coatings on the outside of said first and second layers of regenerated cellulose and being substantially solvent free and coextensive with said layers of regenerated cellulose.

5. A method for producing a laminated packaging material comprising: passing first and second films of regenerated cellulose each of which has a coating of vinylidene chloride interpolymer having a vinylidene chloride content from 50 percent to 95 percent and a fusion point above approximately 270° F.; on each of the major surfaces of each film, between rolls which bias the films together with a force between approximately 600 to 1200 pounds per square inch, causing said films to become adhered without the addition of a solvent by heating the films to a temperature between approximately 190° F. and approximately 200° F. and cooling the resulting laminate.

6. A packaging material produced by the method of claim 1, comprising: first and second layers of regenerated cellulose uniformly and tightly bonded together by an intermediate layer of vinylidene chloride interpolymers having a vinylidene chloride content from 50 percent to 95 percent and a fusion point above approximately 270° F.; said first and second layers also having a pair of similar outer coatings of said interpolymers individual ones of which are uniformly and tightly bonded to respective ones of the outer surfaces of said first and second layers of regenerated cellulose to completely protect said layers of regenerated cellulose, said layer of interpolymer between said first and second layers of regenerated cellulose being substantially solvent free and approximately twice as thick as said coatings on the outside of said first and second layers of regenerated cellulose and being coextensive with said layers of regenerated cellulose, and a layer of printing locked in the center of said intermediate layer of interpolymer.

References Cited by the Examiner

UNITED STATES PATENTS

| | | | |
|---|---|---|---|
| 2,306,046 | 12/1942 | Duggan | 154—50 X |
| 2,354,855 | 8/1944 | Emanuel. | |
| 2,453,052 | 11/1948 | Van Etten | 154—50 X |
| 2,474,896 | 7/1949 | Hauser. | |
| 2,504,417 | 4/1950 | Hofrichter | 154—50 |
| 3,037,868 | 6/1962 | Rosser | 154—50 X |

FOREIGN PATENTS 854,678   11/1956   Great Britain.

EARL M. BERGERT, *Primary Examiner.*